(12) United States Patent
Sherman, II

(10) Patent No.: US 8,276,717 B1
(45) Date of Patent: Oct. 2, 2012

(54) HIGH/LOW SHOE ABUTMENT

(75) Inventor: William Eugene Sherman, II, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 734 days.

(21) Appl. No.: 11/940,383

(22) Filed: Nov. 15, 2007

(51) Int. Cl.
*F16D 65/40* (2006.01)

(52) U.S. Cl. ................................ 188/73.38

(58) Field of Classification Search .... 188/73.35–73.38, 188/205 A
See application file for complete search history.

(56) References Cited

U.S. PATENT DOCUMENTS

| | | | |
|---|---|---|---|
| 5,535,856 A * | 7/1996 | McCormick et al. | 188/73.36 |
| 5,577,577 A * | 11/1996 | Hirai et al. | 188/73.36 |
| 6,003,642 A * | 12/1999 | Mori et al. | 188/73.44 |
| 6,296,085 B1 * | 10/2001 | Yukoku | 188/73.36 |
| 6,378,666 B1 | 4/2002 | Yoko | |
| 6,478,122 B1 | 11/2002 | Demoise, Jr. et al. | |
| 2005/0115779 A1 * | 6/2005 | Nakajima et al. | 188/73.31 |

FOREIGN PATENT DOCUMENTS

JP  2-18353  * 5/1990

* cited by examiner

*Primary Examiner* — Bradley King
*Assistant Examiner* — Vishal Sahni
(74) *Attorney, Agent, or Firm* — Maginot, Moore & Beck

(57) ABSTRACT

A disc brake assembly includes an anchor having a pair of spaced apart inwardly facing contoured surfaces between which a disc brake backing plate having an outwardly facing pair of complementarily contoured surfaces is located. There is a pair of slipper springs, each of which may be interposed between an outwardly facing and corresponding inwardly facing surface in either one of two distinct symmetrical positions. The two slipper springs are substantially identical and include a U-shaped portion with a leg extending from one U end so that the leg may form an abutment contact between a backing plate surface and the anchor surface during brake application. The two distinct symmetrical positions comprise one position with the leg extending generally inwardly from the U-shaped portion toward the brake disc axis, and another position with the leg extending generally outwardly from the U-shaped portion away from the brake disc axis.

5 Claims, 3 Drawing Sheets

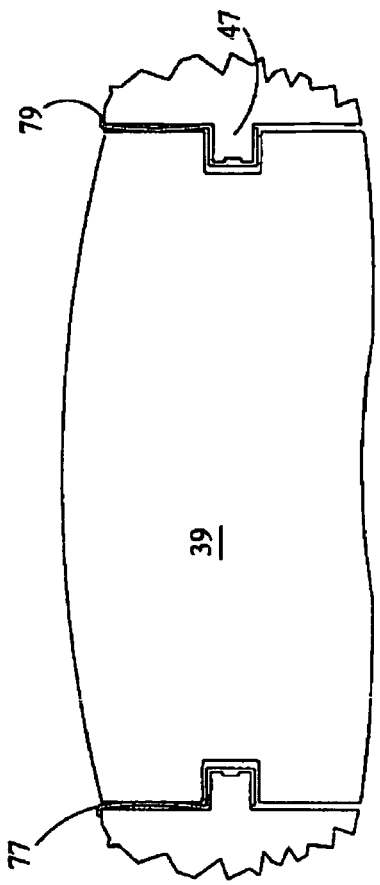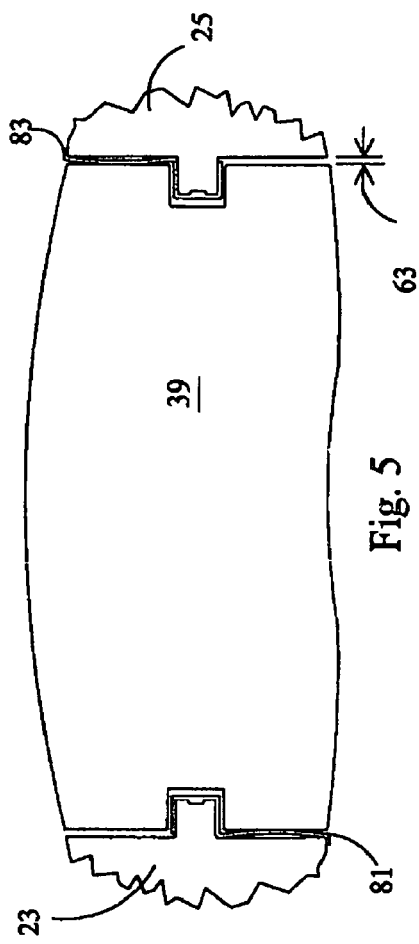

HIGH/LOW SHOE ABUTMENT

BACKGROUND OF THE INVENTION

The present invention relates to disc braking systems and more particularly to improvements in abutment techniques between brake shoe backing plates and anchor brackets.

DESCRIPTION OF THE RELATED ART

Disc brakes generally include a wheel supported rotor spanned by a caliper movably supported on a set of guide pins for movement generally orthogonal to the rotor surface. The caliper supports inboard and outboard brake shoes generally having metal backing plates supporting friction pads for selectively engaging the rotor surfaces. Application of fluid pressure to a cylinder moves a piston and one brake shoe along the caliper and into engagement with the rotor. Continued piston motion draws the caliper along the guide pins to engage the other shoe with the outboard rotor surface. When the brake is actuated, a substantial force is applied by the rotating wheel and rotor to the brake shoes. It is generally impractical to rely on the guide pins which support the caliper to resist this force. An anchor bracket, which is rigidly fixed to the vehicle frame independent of the caliper, is frequently employed to engage the backing plates of the brake shoes and oppose the applied force.

U.S. Pat. No. 6,378,666 describes in greater detail a disc brake of the type described and recognizes the desirability of interposing a slipper between the anchor bracket and backing plate. In this patented arrangement, a spring clip is located in a rail of an anchor of a disc brake to hold the carrier or backing plate for the friction pad and provide a surface on which a projection on the carrier slides during movement of the carrier toward a rotor by an input force to effect a brake application. The spring clip is characterized by a base having a surface thereon that substantially matches and covers the rail. A tab extends from the base and engages the anchor to fix the position of the base in the rail with respect to the rotor. An arm extends inward from the base and has a lip on the end thereof that extends in a plane parallel with the rail. The projection on the carrier engages the arm whenever wear reduces a thickness of the friction pad to a predetermined thickness such that the projection thereafter engages the arm to bring the lip into engagement with the rotor whenever the first friction pad engages the rotor during a brake application. The lip on engagement with the rotor causes the arm to vibrate and thereby create an audible sound designed to alert an operator that optimum braking might thereafter be impaired with continued use of the friction pad. In this patented arrangement, a pair of slipper springs is shared by the inboard and outboard brake shoes and function additionally as a chirper to warn of brake pad wear.

In a similar disc brake, U.S. Pat. No. 6,478,122 provides grooves rather than rails along opposed inwardly facing surfaces of the anchor member. This disc brake has an anchor member with first and second grooves that receive first and second ears on a backing plate to align a friction surface of a friction pad with a rotor. A first slipper spring is secured to the anchor and located between the first groove and the first ear. A second slipper spring is secured to the anchor and located between the second groove and the second ear. The first and second ears correspondingly slide on the first and second slipper springs in response to an input force being applied to move the backing plate toward a rotor to bring the friction surface into engagement with the rotor during a brake application. Each of the first and second slipper springs is characterized by a base with parallel top and bottom side walls that extends therefrom. The top side wall has a lip thereon that engages the anchor to position the base in a groove. The bottom side wall has an arm that extends therefrom along a plane that forms an angle of less than 90 degrees with respect to the base and second wall. The arm tangentially engages a single point contact on the backing plate to resiliently urge the ears away from the grooves to define a first gap between the ear and the base of each slipper and to resiliently urge the ear into engagement with the top side wall to define a second gap between the ear and the bottom side wall such that the backing plate slides in the first and second slipper springs without binding while a radial component of the tangential resilient engagement attenuates movement of the backing plate caused by vibration of the backing plate. In this patented arrangement, a pair of slipper springs is shared by the inboard and outboard brake shoes and function additionally to provide an anti-rattle function. In both patented arrangements, the position of the slipper spring is uniquely determined.

It is desirable to have the option of locating slipper springs in different patterns thereby forming any of several different abutment configurations between a brake shoe and corresponding anchor bracket.

SUMMARY OF THE INVENTION

The present invention provides symmetric surfaces on the anchor bracket and symmetric surfaces on the brake backing plate allowing a slipper spring to be interposed between juxtaposed anchor and backing plate ends in either of two orientations providing a potential abutment surface therebetween located optionally closer to or further away from the wheel axle. The abutment is described as potential since actual rigid sandwiching of the spring between the surfaces occurs only during brake application. A like slipper spring may be interposed between the other pair of juxtaposed anchor and backing plate ends in either of two orientations providing a second abutment surface located optionally closer to or further away from the wheel axle.

The invention comprises, in one form thereof, a disc brake having an anchor with first and second rails correspondingly received in first and second grooves on a brake shoe backing plate to align a friction surface on a friction pad with a rotor. A first slipper spring is secured to the anchor and located between the first groove and the first rail and a second slipper spring secured to the anchor and located between the second groove and the second rail. The backing plate slides along the first and second slipper springs in response to an input force being applied to move the backing plate toward a rotor and the friction surface into engagement with the rotor to effect a brake application. Each of the first and second slipper springs is characterized by a generally U-shaped portion which substantially covers a corresponding rail and a leg extending from one U end forming an abutment contact between one backing plate end and the anchor during brake application. The rails form portions of a pair of spaced apart inwardly facing contoured surfaces and the grooves form portions of an outwardly facing pair of complementarily contoured surfaces. A slipper spring leg is sandwiched between each juxtaposed pair of inwardly and outwardly facing surfaces and the surfaces are spaced from one another by distances somewhat greater than the thickness of the sandwiched leg portion when the brake is unapplied. The inwardly and outwardly facing contoured surfaces have general symmetry about the rails whereby each slipper spring may be optionally positioned with the leg extending radially outward of the corresponding rail or extending radially inward of the corresponding rail.

An advantage of the present invention is that a tendency of the brake pads to move radially during vehicle braking may be alleviated by appropriate slipper spring location.

Another advantage is the same simple spring configuration is employed in either orientation in each location.

BRIEF DESCRIPTION OF THE DRAWINGS

FIG. 4 is a side elevation view of a portion of FIG. 1 showing a brake shoe backing plate located between ends of an anchor and spaced therefrom by a pair of slipper springs each in a high or radially outwardly location;

FIG. 5 is a side elevation view of a portion of FIG. 1 showing a brake shoe backing plate located between ends of an anchor and spaced therefrom by a pair of slipper springs, one in a low or radially inboard location and the other in a high or radially outwardly location;

Corresponding reference characters indicate corresponding parts throughout the several drawing views.

DETAILED DESCRIPTION OF THE INVENTION

Figure 1:
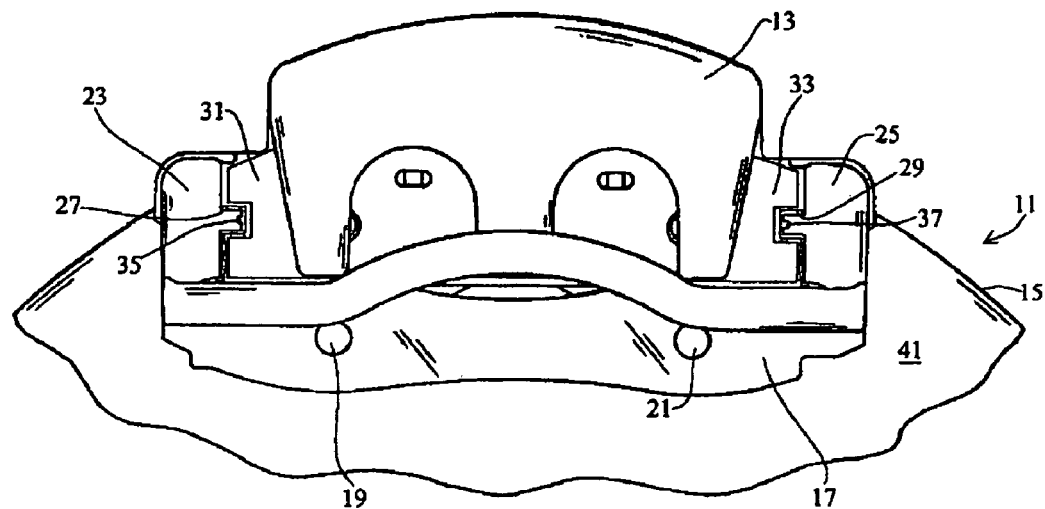
FIG. 1 is a side elevation view of a portion of a disc brake assembly incorporating the present invention.

Referring now to the drawings and particularly to FIG. 1, there is shown a side elevation view of a disc brake assembly 11 having a caliper 13 spanning a rotor 15 which is fixed to and rotates with a vehicle wheel. Brake assembly 11 includes an anchor 17 that is fixed to a rigid portion of a vehicle by bolts 19 and 21 with caliper 13 carried by a plurality of guides that slide in bores in the anchor 17. Comparing FIGS. 1, 2 and 3, anchor 17 has a pair of opposed ends 23 and 25 which are contoured to include inwardly extending rails 45 and 47 that are aligned in a perpendicular relationship with face 41 on rotor 15 by bolts 19 and 21. Rails 45 and 47 are designed to be received in corresponding grooves 49 and 51 in opposed faces of the first backing plate and the second backing plate 39 to guide and maintain the friction pads carried by the backing plates in a parallel relationship with rotor 15. The rails 45 and 47 form portions of a pair of spaced apart inwardly facing contoured surfaces 41 and 53 and the grooves 49 and 51 form portions of an outwardly facing pair of complementarily contoured backing plate surfaces 43 and 55.

Figure 3:
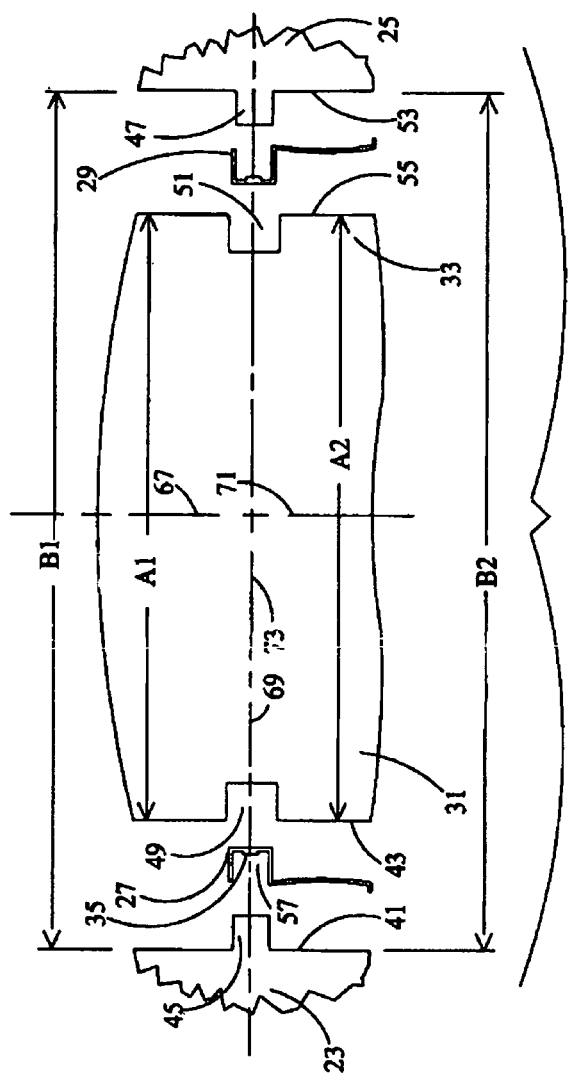
FIG. 3 shows the components of FIG. 2 spaced apart to better illustrate the relationship between the potential engaging surfaces.

The outwardly facing plate surfaces 43 and 55 have a first two-fold axis of symmetry 67 extending generally radially of the brake disc and a second two-fold axis of symmetry 69 extending generally orthogonal to the first axis, and the inwardly facing anchor surfaces have a third two-fold axis of symmetry 71 extending generally radially of the brake disc and a fourth two-fold axis of symmetry 73 extending generally orthogonal to the third axis. As shown in FIG. 3, the first 67 and third 71 axes are generally collinear and the second 69 and fourth 73 axes are also generally collinear with the brake unapplied. This symmetry is further illustrated in FIG. 3 where the distance between the upper portions of the outwardly facing shoe surfaces 43 and 55 is illustrated as A1 while distance between the lower portions of the outwardly facing shoe surfaces 43 and 55 is illustrated as A2. A1=A2. Similarly the dimensions B1 and B2 between inwardly facing surfaces of the anchor in its normal (unexploded) configuration are equal. While the embodiment illustrated is preferred, symmetry about the axes 69 and 73 and the equalities A1=A2 and B1=B2 are not absolutely essential. It is possible to incline the surfaces 41 and 53 somewhat so that extensions of those surfaces intersect near or on the rotor axis. Similar inclination of surfaces 43 and 55 would retain symmetry about axes 67 and 71 and still provide the optional placement of either slipper spring 27 or 29 with its spring leg extending either away from or toward the rotor axis. Of course, those portions of the backing plate and anchor which do not provide potential abutment surfaces or participate in locating the slipper spring may lack symmetry.

Figure 7:
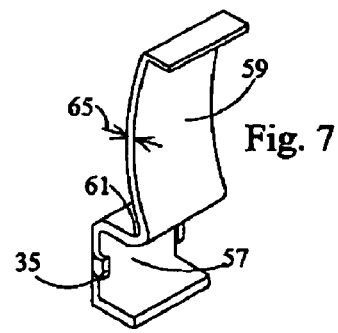
FIG. 7 is an isometric view of one slipper spring of the type employed in FIGS. 1-6.

Each of the slipper springs 27 and 29 includes a generally U-shaped portion 57 best seen in FIGS. 3 and 7 which substantially covers a corresponding rail 45 or 47 and a leg 59 extending from one U end 61 forming a potential abutment for contact between one backing plate end and the anchor during brake application. Tabs such as 35 and 37 engage the rail ends to prevent movement of the slipper in a direction orthogonal to the rotor face 41 as the backing plates move during brake operation. The slipper spring leg such as 59 is sandwiched between each juxtaposed pair of inwardly 41 and 53 and outwardly 43 and 55 facing surfaces with the surfaces spaced from one another by distances as illustrated at 63 in FIG. 2 which are somewhat greater than the thickness 65 of the sandwiched leg portion when the brake is unapplied.

Figure 2:
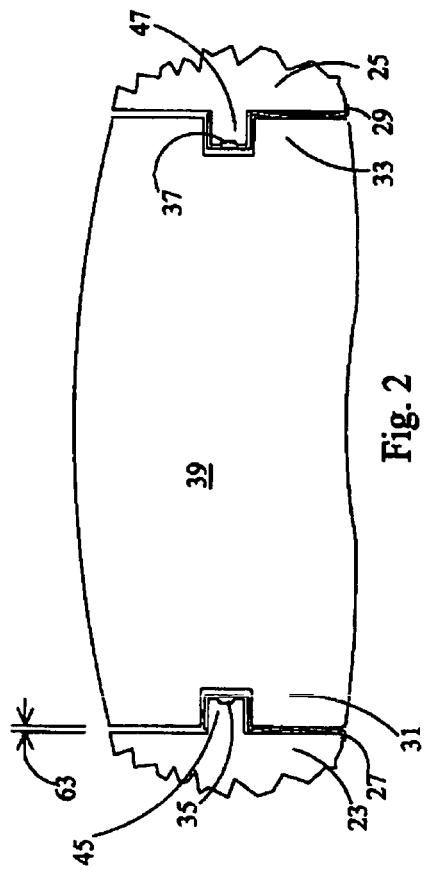
FIG. 2 is a side elevation view of a portion of FIG. 1 showing a brake shoe backing plate located between ends of an anchor and spaced therefrom by a pair of slipper springs each in a low or radially inboard location.

The anchor and backing plate symmetry affords the option of placing either slipper spring of either the inboard or outboard brake shoe with the leg such as 59 extending generally inwardly toward the wheel axle as shown for both springs 27 and 29 in FIGS. 2 and 3; with both legs extending away from the wheel axle as shown for springs 77 and 79 in FIG. 4; or with one spring leg extending inwardly as shown for spring 81 and the other outwardly as for spring 83 in FIG. 5. Of course, the right hand spring in the view of FIG. 5 could have extended inwardly and the other outwardly if desired. Due to the symmetry, the direction of leg extension is not exactly radial, only approximately. Thus, each slipper spring may be optionally positioned with the leg extending generally radially outward of the corresponding rail or extending generally radially inward of the corresponding rail.

Figure 6:
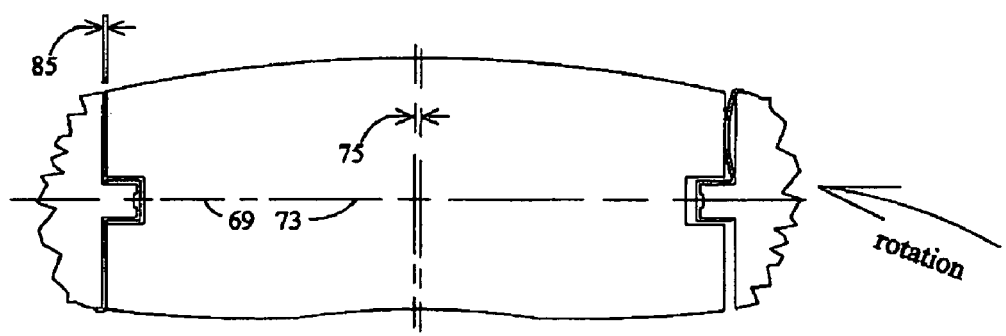
FIG. 6 illustrates the relocation of the shoe backing plate of FIG. 4 during braking.

When an operator desires to effect a brake application, pressurized fluid is supplied to an actuation chamber located in the caliper 13. The pressurized fluid supplied to the actuation chamber acts on a piston (not shown) to move a first or inboard backing plate (not shown) toward rotor 15 and bring a first friction pad (not shown) into engagement with a first face on the rotor and acts on the caliper 13 to move a second backing plate 39 along springs 27 and 29 toward the rotor 15 to bring a second friction pad (not shown) into engagement with a second face 41 on the rotor 15 to effect a brake application. As the brakes are applied, rotor rotation in the direction of the arrow in FIG. 6 induces compression of the juxtaposed surfaces 41 and 43 and the leg of spring 81 which is sandwiched therebetween as shown in FIG. 6. A small gap 85 which is substantially the same as the spring thickness 65 remains between the face portions not sandwiching a spring. Comparing FIGS. 3 and 6, the second and fourth axes 69 and 73 remain generally collinear during a braking operation while the first axis 67 extends parallel to and displaced from the third axis 71 during a braking operation by a distance 75 which is essentially the difference between the gap 63 and the slipper spring thickness 65.

Thus, while a preferred embodiment has been disclosed, numerous modifications will occur to those of ordinary skill in this art. Accordingly, the scope of the present invention is to be measured by the scope of the claims which follow.

What is claimed is:

1. A disc brake assembly comprising:
    an anchor including a first inwardly facing surface and a second inwardly facing surface,
        the first inwardly facing surface including a first rail, a first generally planar outer surface extending radially outwardly from the first rail relative to a brake disc axis, and a first generally planar inner surface extending radially inwardly from the first rail relative to the brake disc axis,
        the second inwardly facing surface including a second rail, a second generally planar outer surface extending radially outwardly from the second rail relative to the brake disc axis, and a second generally planar inner surface extending radially inwardly from the second rail relative to the brake disc axis,
    a brake shoe backing plate including a first outwardly facing surface and a second outwardly facing surface,
        the first outwardly facing surface including a first groove in which the first rail is received, a third outer surface extending radially outwardly from the first groove relative to the brake disc axis, and a third inner surface extending radially inwardly from the first groove relative to the brake disc axis,
        the second outwardly facing surface including a second groove in which the second rail is received, a fourth outer surface extending radially outwardly from the second groove relative to the brake disc axis, and a fourth inner surface extending radially inwardly from the second groove relative to the brake disc axis,
    a first slipper spring including a U-shaped portion and a leg portion, the U-shaped portion being positioned on the first rail with the leg portion extending between the first outer surface and the third outer surface or between the first inner surface and the third inner surface; and
    a second slipper spring including a U-shaped portion and a leg portion, the U-shaped portion being positioned on the first rail with the leg portion extending between the second outer surface and the fourth outer surface or between the second inner surface and the fourth inner surface;
    wherein the first and the second inwardly facing surfaces and the first and the second outwardly facing surfaces each have a two-fold axis of symmetry on a first axis that intersects the first rail, the second rail, the first groove, and the second groove,
    wherein the first inwardly facing surface and the second inwardly facing surface have a two-fold axis of symmetry on a second axis that is perpendicular to the first axis,
    wherein, when a braking operation is not being performed,
        the first slipper spring biases the first inwardly facing surface and the first outwardly facing surface apart from each other by a distance that is greater than a thickness of the first slipper spring, and
        the second slipper spring spaces the second inwardly facing surface and the second outwardly facing surface apart from each other by a second distance that is greater than a thickness of the second slipper spring, and
    wherein, when a braking operation is being performed,
        the brake shoe moves in a direction from the second inwardly facing surface toward the first inwardly facing surface and the first slipper spring is compressed between the first outer surface and the third outer surface or between the first inner surface and the third inner surface such that the first inwardly facing surface and the first outwardly facing surface are spaced apart by a distance that corresponds to a thickness of the first slipper spring,
    wherein the leg portion of each of the first and the second slipper spring includes a lip portion that extends substantially perpendicularly with respect to the leg portion from a distal end portion of the leg portion in a direction away from the first and the second outwardly facing surfaces, respectively.

2. The disc brake assembly of claim 1, wherein the first, the second, the third, and the fourth outer surfaces and the first, the second, the third, and the fourth inner surfaces are all generally planar and arranged substantially parallel to each other,
    wherein the first outer surface is spaced apart from the second outer surface by a first distance and the first inner surface is spaced apart from the second inner surface by the first distance,
    wherein the third outer surface is spaced apart from the fourth outer surface by a second distance, and the third inner surface is spaced apart from the fourth inner surface by the second distance; and
    wherein the second distance is less than the first distance by an amount that is greater than the combined thickness of the first and the second slipper spring.

3. The disc brake assembly of claim 1, wherein the first slipper spring and the second slipper spring are identical.

4. The disc brake assembly of claim 1 wherein the first leg portion of the first slipper spring and the leg portion of the second slipper spring are each curved to form a spring.

5. The disc brake assembly of claim 4, wherein, when a braking operation is being performed, the leg portion of the first slipper spring is compressed flat between the first outer surface and the third outer surface or between the first inner surface and the third inner surface.

* * * * *